United States Patent [19]

Riley

[11] Patent Number: 5,010,530

[45] Date of Patent: Apr. 23, 1991

[54] MAGNETIC COUPLER FOR ELECTROACOUSTIC HYDROPHONES

[75] Inventor: Thomas P. Riley, Westport, Mass.

[73] Assignee: The United States of America as represented by the Secretary of the Navy, Washington, D.C.

[21] Appl. No.: 544,574

[22] Filed: Jun. 26, 1990

[51] Int. Cl.[5] .............................................. G01V 1/38
[52] U.S. Cl. ..................................... 367/154; 367/20; 340/870.16; 340/850
[58] Field of Search ................................ 367/20, 154; 340/870.16, 850; 310/337

[56] References Cited

U.S. PATENT DOCUMENTS

| | | |
|---|---|---|
| 3,374,434 | 3/1968 | Perry ........................... 340/850 |
| 3,614,725 | 10/1971 | Moran ........................... 367/157 |
| 4,625,172 | 11/1986 | Yamamura et al. ............ 324/326 |

*Primary Examiner*—Deborah L. Kyle
*Assistant Examiner*—J. Woodrow Eldred
*Attorney, Agent, or Firm*—Michael J. McGowan; Prithvi C. Lall

[57] ABSTRACT

A magnetic coupler and the use of such couplers to place a plurality of electroacoustic transducers around a lengthy single conductor trunk cable is described. The magnetic couplers are used to place the electroacoustic transducers in any randomly selected configuration. They allow the use of a single conductor trunk cable so as to facilitate the deployment of the system at a relatively low cost.

7 Claims, 1 Drawing Sheet

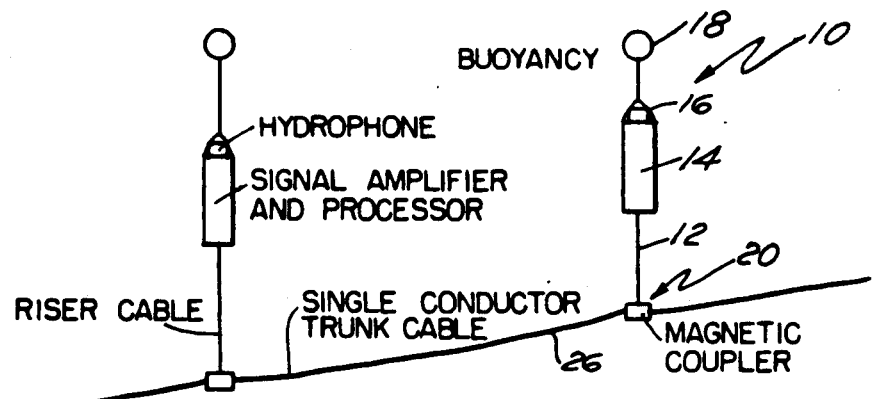
FIG. 1
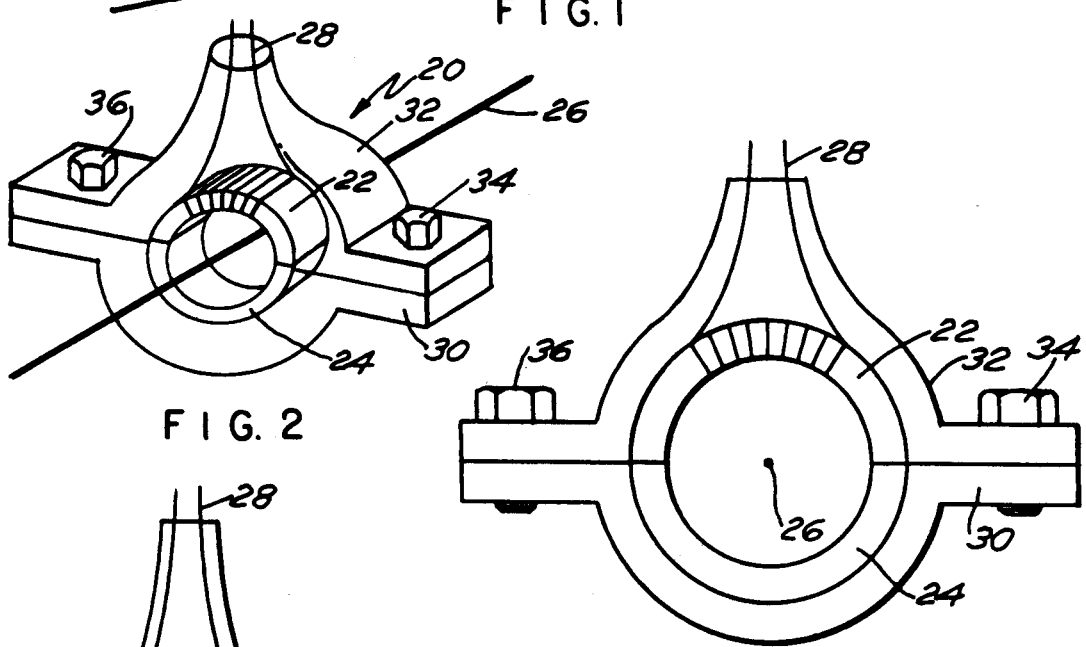
FIG. 2
FIG. 3
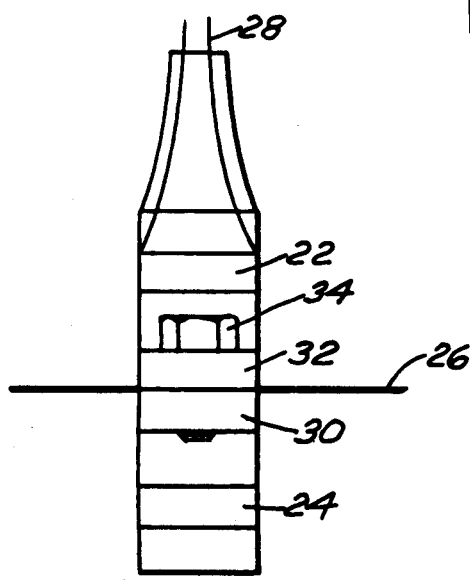
FIG. 4

MAGNETIC COUPLER FOR ELECTROACOUSTIC HYDROPHONES

STATEMENT OF GOVERNMENT INTEREST

The invention described herein may be manufactured and used by or for the Government of the U.S. of America for governmental purposes without the payment of any royalties thereon or therefor.

BACKGROUND OF THE INVENTION

1. Field of the Invention

This invention generally relates to the field of electroacoustic transducers such as hydrophones and more specifically to an apparatus and technique for coupling magnetically a plurality of electroacoustic transducers or hydrophones to a single conductor trunk cable using seawater as the electrical return path.

2. Statement of the Prior Art

One of the common requirements in most of the oceanographic communication studies is to collect at the shore end of a trunk cable acoustic data which is transmitted from a cooperative underwater target in order to determine its position in three dimensions as a function of time. For such applications, metallic connections using either underwater connectors or pre-molded splices have been used to connect a plurality of hydrophones to the trunk cable. This puts pre-deployment constraints on the location of hydrophones and complicates the deployment process as any discontinuity (e.g., a connector) must be passed through pulleys, drums and other apparatus as required to hold and properly deploy miles of trunk cable. Trunk cables used in the past for such applications have typically employed two conductor-cables usually in a coaxial configuration which puts an additional constraint in deploying long lengths of such cable. It is thus desirable to have an apparatus which can improve deployment of a trunk cable which avoids the use of connector and uses a single conductor cable.

SUMMARY OF THE INVENTION

This invention teaches the use of magnetic couplers to connect transponder-like devices to a main trunk cable which utilizes a single conductor as seawater is used as the return path. The use of magnetic couplers eliminates the use of connectors which greatly improves its deployment. Furthermore, the use of a single conductor cable further facilitates the deployment of miles of the trunk cable because of its reduced diameter.

It is an object of subject invention to use magnetic couplers for deploying transponder-like devices along the length of a long trunk cable.

Another object of subject invention is to use magnetic couplers to deploy a plurality of transponder-like devices located at any randomly selected position on the trunk cable and thus increasing flexibility of configuration of the detection system.

Still another object of subject invention is to use seawater as the return path which permits the use of a single conductor trunk cable and thus improving its deployment.

Another object of subject invention is to reduce the cost of the trunk cable by using a single conductor trunk cable.

Other objects, advantages and novel features of the invention will become apparent from the following detailed description thereof when considered in conjunction with the accompanying drawings wherein:

BRIEF DESCRIPTION OF THE DRAWING

FIG. 1 is a schematic arrangement of the teachings of subject invention.

FIG. 2 is a perspective view of a magnetic coupler used around a single conductor trunk cable.

FIG. 3 is a front-view of the magnetic coupler of FIG. 2.

FIG. 4 is a side-view of the magnetic coupler of FIG. 2.

DESCRIPTION OF THE PREFERRED EMBODIMENT

Referring to the drawings wherein like reference characters designate identical or corresponding parts throughout various figures, FIG. 1 shows a schematic arrangement 10 using the couplers 20 placed at random points of a trunk cable 26 which is preferably a single conductor trunk cable. Two conductor riser cable 12 is connected to magnetic coupler 20 at one end and to a conventional signal amplifier and processor 14 at the other end. The signal amplifier and processor including power are preferably housed in a waterproof can or unit which is capable of withstanding ambient pressure. Unit 14 and integral hydrophone 16 is connected to a float 18 used for keeping the assembly upright.

FIG. 2 shows a perspective view of a magnetic coupler 20 according to the teachings of subject invention. It is preferably in the form of a split toroid magnetic core and includes two halves 22 and 24 encased in encapsulants 32 and 30 respectively. Encapsulated halves 22 and 24 are engagable around any preselected point of a long trunk cable 26 and are held together by fasteners or bolts 34 and 36. These fasteners can be snap fasteners requiring no tools for their use. Toroid half 22 has several turns of wire 28 attached to the riser cable 12 which acts as the primary of a transformer and trunk cable 26 forms the secondary of the transformer with only one turn. The bottom half of the toroid core has no wires and serves only to complete the magnetic path. The split coupler allows it to be easily attachable to the trunk cable particularly if snap fasteners are used.

FIG. 3 shows a front view of the magnetic coupler of FIG. 2 whereas FIG. 4 shows an end view of the magnetic coupler of FIG. 2.

Acoustic signals generated by a cooperative target are converted to electrical energy by hydrophone 16, then amplified and processed in unit 14 which functions similar to a transponder, except that its response is not acoustic. Instead, the response consists of a burst of electrical energy which is magnetically coupled with the trunk cable. The bursts generated by each transponder-like device are unique, and time delays between the pulses characterize the position of the cooperative target. It should be clearly understood that other modes of signal processing are possible without deviating from the teachings of subject invention.

Laboratory experiments have shown that a 30 turn primary for the magnetic coupler gives reasonably good transfer characteristics. The primary side is series tuned to the desired operating frequency and the reactive primary can actually produce a voltage step up at resonance. This almost fully compensates for the 30:1 step down of the transformer. When coupled to the single turn secondary, overall voltage losses are only about 3 dB.

Computer analyses and field tests have characterized the performance of a typical single conductor seawater return cable constructed of #14 AWG copper wire with polyurethane jacket. Characteristic impedance is about 74 ohms and the losses per unit length are on the order of 0.8 db/Km at 5 KHz and 1.5 db/Km at 15 KHz.

Shallow ranges require many hydrophones to get a moderate tracking area. With so many hydrophones, the use of acoustic transponders is often prohibitive due to the resulting acoustic din. One solution often used is to employ sonobuoys, thus putting the replies in the RF spectrum. However, they must be installed and resurveyed often as sonobuoy ranges cannot be left in place for much longer than a few days, since they are subject to the effects of weather, sea state, tides, traffic and even pilfering. Secondly, they are usually tethered to an anchor, with sufficient slack to allow for tides as they afford limited accuracy due to the watch circle of uncertainty in their position.

The seawater return approach with magnetically coupled hydrophones overcomes many of these difficulties. Since all replies are non-acoustic, their responses do not contaminate the medium and up-front costs are low as a result of the simplicity of a single conductor trunk cable and no need for pressurized electronics multiplexers. Also, the installation is simplified as canisters can easily be attached after the last cable pulley. All seaside equipment is located on the ocean bottom, thus supporting either long or short term installations.

Deep water ranges typically employ less hydrophones per unit area, but the problems and considerations are similar. The use of acoustic transponders is sometimes employed, but still contributes unnecessary acoustic "noise". Because of this, they are almost never used on noise measurement ranges. When employed, they are liable to battery replacement and resurveying considerations. Due to the greater separation of hydrophones, deep water ranges tend to require more cable than shallow ranges, thus cable costs become a prime consideration, and deep sea electronic multiplexers still suffer from considerable cost and complexity. Thus, for many of the same reasons, deep water ranges can realize several cost and technical benefits by employing magnetically coupled hydrophones to a single conductor trunk cable.

Some of the fundamental considerations for such a system are: what is the maximum number of hydrophones which can be coupled to a single trunk cable, and what is the greatest cable length which can be supported? The first parameter is governed by the available spectrum and frequency spacing of the electronics canisters. Experimental data suggests that frequencies extending from near DC to about 15 KHz can be supported, but that it is only a cable consideration. In reality a lower limit of about 5 KHz would be more practical. To go much lower than this puts increasingly greater demands on circuit Q, transformer efficiency and the like. This is not to say that lower reply frequencies are impossible; just increasingly more difficult.

Frequency spacing is dictated by processing bandwidth, timing resolution and oscillator accuracy. Spacings of 250 Hz are possible, but 500 Hz is more practical and has been used extensively. Any narrower than this puts serious limitations on timing accuracy and frequency stability. Thus, about 20 electronics canisters, each replying at a unique frequency, could be deployed on a single trunk cable. More sophisticated processing techniques could be used to increase this figure, but it is preferred to base the analysis on conventional methods. Similarly, duplicate reply frequencies could be used on the same trunk cable if their identity could be resolved by spatial separation but this can add considerable complexity to the signal processing task. If more than 20 hydrophones are needed, the straightforward solution is to employ more than one trunk cable.

The issue of maximum cable length is determined by signal-to-noise ratio (hereinafter referred to as SNR). Measurements have shown that self noise on a coaxial cable run from deep sea to shore is about $-145$ dbV/Hz$^{\frac{1}{2}}$ the frequency range of interest. This is not affected by cable length, and is the result of electromagnetic interference (EMI) pickup in the shallow waters near shore. The SNR which arrives at the input to the shore processor will determine if the signal is at all detectable. Once detectable, increasing the SNR provides increased timing accuracy up to a given threshold, beyond which no further improvements will be realized. For a typical energy detector type signal processor of unsophisticated design, this SNR threshold is about $+45$ db when measured in a 1 Hz band.

Assuming a $+20$ dbV source level (10 watts into 10 ohms), 3 db loss in the coupler, 6 db matching loss (cable characteristic impedance to shore load impedance), and a $-100$ dbV shore signal level requirement (45 db SNR), yields a maximum cable loss of about 110 db. This translates to about 100 Km at 15 KHz and 140 Km at 5 KHz. These great distances are very attractive and offer significant savings in the installed cost per unit length. Clearly, the high frequencies should be placed dearer the shore end of the cable in order to obtain the highest SNR and greatest possible cable lengths.

Briefly stated, a magnetic coupler which is used to couple a plurality of electroacoustic transducers at various points of a trunk cable includes a split toroid magnetic core with its two halves encapsulated and easily attachable to the trunk cable at any desired point using snap fasteners or the like. A hydrophone, signal processing electronics and power source are housed in a waterproof canister capable of withstanding the ambient pressure. The signal processing electronics and power source acts like a transponder to transmit information via the single conductor trunk cable to the shore facility many miles away from the hydrophones.

From the foregoing description, one skilled in the art can easily ascertain the essential characteristics of this invention and without departing from the spirit and scope thereof, can make various changes and modifications of the invention to adapt to various usages and conditions. As an example, the number of hydrophones used coupled to a single trunk cable can vary. Additionally, the mode of transmitting electric signals may also vary. The method of attaching the magnetic coupler to the trunk cable can also vary depending upon the type of fasteners used for the purpose. It is therefore understood that within the scope of the appended claims the invention may be practiced otherwise than as specifically described.

What is claimed is:

1. A magnetic coupler for coupling a plurality of electroacoustic transducers to a trunk cable which comprises:
   a split magnetic core including at least two sections, a first section and a second section;

a pair of encapsulants, first encapsulant for said first section of said split magnetic core and a second encapsulant for said second section of said split magnetic core, forming encapsulated first and second sections of said split magnetic core;

fastener means for mounting said first and second encapsulated sections of said split magnetic core around said trunk cable at any preselected points thereof, thus coupling said encapsulated second section of said split magnetic core thereto;

a plurality of electronic processors including power source for supplying power to each of said plurality of electroacoustic transducers;

means for connecting an output of a member of said plurality of transducers to a corresponding member of said plurality of electronic processors; and means for coupling an output of a member of said plurality of electronic processors to said encapsulated first section of said split magnetic core.

2. The magnetic coupler of claim 1 wherein said split magnetic core is generally a toroid including a first half as said first section and a second half as said second section thereof.

3. The magnetic coupler of claim 2 wherein said means for coupling the output of a member of said plurality of said encapsulated first half of said split toroid is a wire having a plurality of turns around said encapsulated first half of said split toroid magnetic core.

4. The magnetic coupler of claim 3 wherein said plurality of transducers are held afloat using buoyant means.

5. The magnetic coupler of claim 3 wherein said split magnetic core toroid is made of iron core.

6. The magnetic coupler of claim 4 wherein said plurality of electroacoustic transducers are hydrophones.

7. A method for coupling a plurality of electroacoustic transducers and a plurality of associated electronic processors including power sources to a relatively long trunk cable using a plurality of magnetic couplers, each members of said plurality of magnetic couplers including a split magnetic core having at least two encapsulated sections, a first encapsulated section and a second encapsulated section, said method includes the steps of:

connecting each member of said plurality of electroacoustic transducers to a respective member of said plurality of electronic processors;

connecting the output of each member of said plurality of electronic processors to said first encapsulated section of said split magnetic core; and coupling each member of said plurality of split magnetic coupler to said trunk cable at a randomly selected point thereof.

* * * * *

Disclaimer 5,010,530—Thomas P. Riley, Westport, Mass. MAGNETIC COUPLER FOR ELECTROACOUSTIC HYDROPHONES. Patent dated April 23, 1991. Disclaimer filed Nov. 12, 1996, by the assignee, The United States of America as represented by the Secretary of the Navy.

Hereby enters this disclaimer to the remaining term of said patent.
*(Official Gazette,* June 17, 1997)